United States Patent [19]

Sasaki et al.

[11] Patent Number: 4,763,477
[45] Date of Patent: Aug. 16, 1988

[54] METHOD OF CONTROLLING SUPERCHARGE PRESSURE AND APPARATUS FOR REALIZING THE SAME

[75] Inventors: Kenichi Sasaki, Yokohama; Yoshio Iwasa, Nagareyama, both of Japan

[73] Assignee: Nissan Motor Co., Ltd., Yokohama, Japan

[21] Appl. No.: 812,368

[22] Filed: Dec. 23, 1985

[30] Foreign Application Priority Data

Dec. 27, 1984 [JP] Japan ................................. 59-277971

[51] Int. Cl.$^4$ ............................................. F02D 23/00
[52] U.S. Cl. ......................................... 60/602; 60/603
[58] Field of Search .................. 60/600, 601, 602, 603

[56] References Cited

U.S. PATENT DOCUMENTS

2,944,786  7/1960  Angell et al. ........................... 253/55
4,227,372 10/1980  Kakimoto et al. ..................... 60/602
4,556,038 12/1985  Okamoto et al. .................. 60/602 X
4,597,264  1/1986  Cipolla ................................. 60/602

Primary Examiner—Stephen F. Husar
Attorney, Agent, or Firm—Foley & Lardner, Schwartz, Jeffery, Schwaab, Mack, Blumenthal & Evans

[57] ABSTRACT

A supercharge pressure control apparatus having a plurality of detectors, a control valve for controlling the exhaust gas flow flowing into an exhaust gas turbine, first and second electromagnetic valves for selectively controlling the control valve in response to control signals, and an electronic control unit for controlling the first and second electromagnetic valves in accordance with operating conditions of the engine. The opening of the control valve is compulsorily opened to a predetermined opened condition when the vehicle is in the idling condition or it is running at low speed below a preset vehicle speed through the second electromagnetic valve, while maintaining supercharge pressure control by the control valve through the first electromagnetic valve when the actual vehicle speed is above the preset vehicle speed. Excessive increase in engine speed during no load conditions or an idling condition of the engine can be prevented, while a sufficient output power can be obtained at the initial period of a suddenly accelerated condition of the vehicle without excessive reduction of the exhaust gas flow rate.

2 Claims, 6 Drawing Sheets

METHOD OF CONTROLLING SUPERCHARGE PRESSURE AND APPARATUS FOR REALIZING THE SAME

BACKGROUND OF THE INVENTION (1) Field of the Invention

The present invention relates to a supercharge pressure control method and apparatus for vehicles having a turbocharger and an internal combustion engine supercharged by the turbocharger.

(2) Description of the Prior Art

It has been widely practiced heretofore that intake air is supercharged by a turbocharger in order to improve the output power of the internal combustion engine.

The turbocharger comprises an exhaust gas turbine driven by the exhaust energy of the engine, and an intake air compressor capable of being rotated by the exhaust gas turbine for supercharging the intake air. The exhaust gas turbine is, on the other hand, rotated at high speed when the exhaust gas flow rate of the engine increases and it can drive the compressor efficiently. However, in a low load operation zone of the engine having a small exhaust gas flow rate, it is inevitable that the supercharge efficiency of the exhaust gas turbine lowers.

For the purpose of preventing the number of rotations of the exhaust gas turbine from lowering and for efficiently supercharging the turbine even in the relatively small engine load zone, a supercharge pressure apparatus has already been proposed in which a control valve is provided at the inlet of the exhaust gas turbine for controlling the exhaust gas flow speed, and the opening of the control valve is controlled in accordance with the operating conditions of the engine, thereby reducing the opening of the control valve in a low load operation zone having less exhaust gas flow, so as to increase the exhaust gas flow and meet the purpose (see, for instance, U.S. Pat. No. 2,944,786).

In this kind of the supercharge pressure apparatus, however, the supercharge pressure is increased with minimum opening of the control valve when the engine load is low, so as to increase the output power of the engine. Accordingly, in a vehicle having an automatic transmission, when the transmission is suddenly changed from a neutral or neutral position to a running range or running position during the idling condition of the engine or when the vehicle is changed from low speed running condition to a suddenly accelerated condition, a large drive torque tends to be suddenly transmitted to the power train. Namely, the large drive torque from the engine tends to be suddenly transmitted from the output side of the transmission to the power train such as the differential gear mechanism of the wheels via a propeller shaft, with the gears of the transmission maintained at a low speed position. As a result, the power train temporarily becomes overloaded and there occurred a problem that durability of the power train was often reduced.

SUMMARY OF THE INVENTION

It is therefore an object of the present invention to provide a supercharge pressure control apparatus for a turbocharger, which overcomes the above drawbacks.

It is another object of the present invention to provide a supercharge pressure control apparatus for a turbocharger in which when a vehicle speed is changed from a low speed running condition to a suddenly accelerated condition, an excessively large drive torque can be prevented from being transmitted to a power train.

It is still another object of the present invention to provide a supercharge pressure control apparatus for a turbocharger in which when the vehicle is in the idling condition or is running at a low speed, below a predetermined vehicle speed, the flow speed of the exhaust gas flowing into an exhaust gas turbine is lowered by forcibly opening the control valve.

It is yet still another object of the present invention to provide a supercharge pressure control apparatus for a turbocharger in which excessive increase in the engine speed during a no load condition or idling condition of the engine can be prevented.

It is still further object of the present invention to provide a method and an apparatus for controlling supercharge pressure in which even when a control value is set to an excessively small value, a sufficient output power can be obtained at the initial period of the rapid accelerated condition of the vehicle without excessive reduction of the exhaust gas flow rate.

One of the features of the present invention resides in a method of controlling supercharge pressure for a turbocharger, which comprises the steps of: detecting engine speed, intake air flow rate, actual supercharge pressure, and actual vehicle speed of a vehicle; comparing the actual supercharge pressure thus detected, with a preset supercharge pressure read from a memory; controlling the degree of opening of a control valve for controlling the flow speed of the exhaust gas flowing into an exhaust gas turbine through a first electromagnetic valve in accordance with the result of the first comparison; comparing the actual vehicle speed thus detected, with a preset vehicle speed read from said memory; and compulsorily opening the opening of said control valve to a predetermined opened condition through a second electromagnetic valve in accordance with the result of the second comparison, so as to prevent the supercharged pressure from increasing in the idling condition or at low speed running condition of the vehicle.

Another feature of the present invention resides in a supercharge pressure control apparatus for a turbocharger, which comprises; a plurality of detectors for detecting engine speed, intake air flow rate, actual supercharge pressure, actual vehicle speed, etc.; control valve means provided at the inlet portion of an exhaust gas turbine for controlling the flow speed of the exhaust gas flowing into said turbine and having a diaphragm and a linkage member connected between said diaphragm and a control flap for opening and closing said inlet portion in accordance with operating conditions of the engine; a first electromagnetic valve provided in a path communicating the first pressure chamber of said control valve with the downstream of intake air path for controlling said control valve in accordance with a first control signal; a second electromagnetic valve providing another path communiating the second pressure chamber of said control valve with the outlet portion of an intake air compressor for controlling said control valve in accordance with a second control signal; and an electronic control unit including a microprocessor having a CPU, a RAM, a ROM, so as to control said first and second electromagnetic valves by said first and second signals in accordance with the operating conditions of the engine, such as engine speed, intake air flow rate, supercharge pressure, vehicle speed, etc., thereby compulsorily opening the opening of said control valve to a predetermined opened condition when the vehicle is in the idling condition or it is running at low speed below a preset vehicle speed through said first electromagnetic valve.

According to the present invention, excessive increase in the engine speed during a no load condition or idling condition of the engine can be prevented, while a sufficient output power can be obtained at the initial period of the rapid accelerated condition of the vehicle without excessive reduction of the exhaust gas flow rate.

These and other objects, features and advantages of the invention will be better understood from the following detailed description with reference to the accompanying drawings.

DESCRIPTION OF THE PREFERRED EMBODIMENTS

Figure 1:
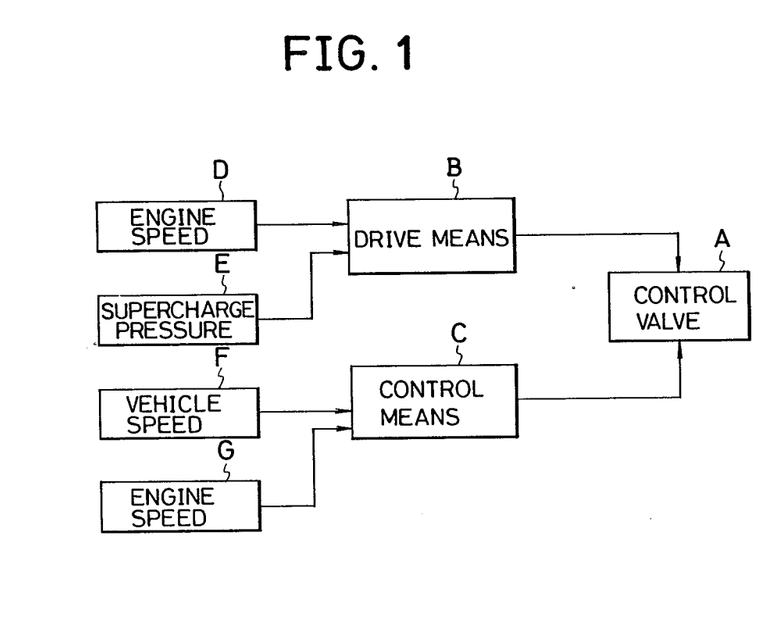
FIG. 1 illustrates a block diagram showing the basic concept of the supercharge pressure control method and apparatus according to the present invention.

FIG. 1 shows a basic conception of the supercharge pressure control apparatus for a turbocharger, which comprises a control valve A provided at the inlet portion of the exhaust gas turbine of the turbocharger for controlling the exhaust gas flow speed to be flowed into the turbine, drive means B for performing a feedback control of the opening of the control valve A so as to obtain a predetermined supercharge pressure in accordance with the operating conditions of the engine, e.g., the engine speed from an engine speed detector D and intake air flow rate (engine load) not shown, and the supercharge pressure from a supercharge pressure detector E, and control means C for controlling the control valve in such a manner that when the vehicle is running at low speed or it is in the idling condition, the control valve A is compulsorily opened at a predetermined opening value in accordance with the conditions of either the low speed running condition below a predetermined vehicle speed, or at the idling condition of the vehicle, and of the low engine speed condition below a predetermined engine speed detected by a vehicle speed detector F and an engine speed detector G.

With this construction, the opening of the control valve A is feedback controlled by the drive means B so as to obtain a predetermined supercharge pressure in accordance with the operating conditions of the engine when the vehicle is running above the preset speed, and the exhaust gas speed flowing into the exhaust gas turbine is controlled thereby. As a result, actual supercharge pressure is controlled to an appropriate supercharge pressure in accordanced with the operating conditions of the engine.

On the other hand, when the engine of the vehicle is in the idling condition, the control valve A for the turbocharger is compulsorily opened above the predetermined opening value by the control means C and the supercharge pressure is not increased by the suppression of the exhaust gas flow speed flowing into the exhaust gas turbine. As a result, the idling output of the engine cannot be increased more than a necessary level. Accordingly even when the transmission is changed in this condition from the neutral position to the running position thereof, no temporarily excessive drive torque is transmitted to the power train of the vehicle.

Similarly, when changed from the low speed running condition to the suddenly accelerated condition of the vehicle, the excessively large drive torque can be prevented from being transmitted to the power train.

Moreover, even if the opening of the control valve A is set up at an excessively small value for some reason, a sufficient output power can be obtained without excessive reduction of the exhaust gas flow since the opening of the control valve A is controlled at a suitable opening value at the initial time period of the changing from the low speed to the suddenly accelerated condition of the vehicle.

Figure 2:
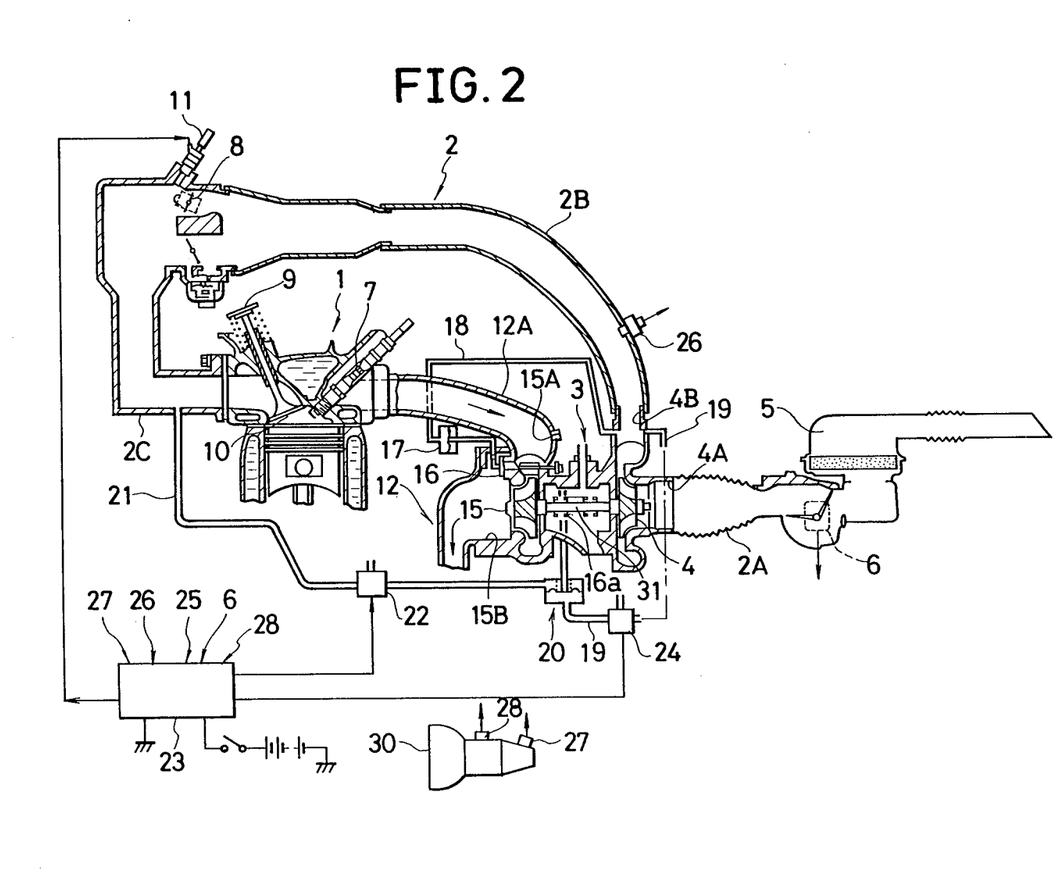
FIG. 2 is an overall engine system having a turbocharger to which the present invention has been applied.
Figure 3:
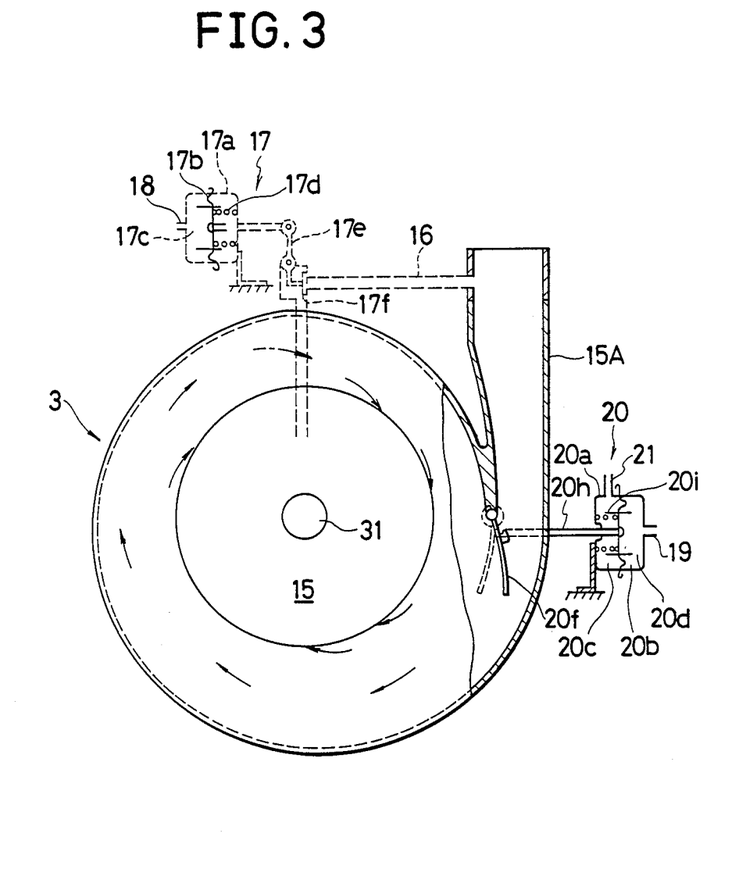
FIG. 3 is an enlarged cross-sectional view of the exhausted gas turbine having a control flap and a control valve, shown in FIG. 2, and FIGS. 4-6 are control program flowcharts for realizing the method of controlling supercharge pressure using the electronic control unit having a microprocessor, according to the present invention.

Referring to FIGS. 2 and 3, there is shown a construction of an overall engine system having a turbocharger and an enlarged cross-sectional view of the exhaust gas turbine and the control valve to which the supercharge pressure control apparatus according to the present invention has been applied.

Reference numeral 1 indicates an engine, numeral 2 indicates an intake air path, numeral 3 indicates the turbocharger for supercharging the intake air. An intake air compressor 4 and an exhaust gas turbine 15 are coupled to each other by the rotative shaft 31 of the turbocharger and the compressor 4 is driven by the rotation of the exhaust gas turbine 15.

On the upstream side intake air path 2A connected to the inlet portion 4A of the compressor 4, there is provided an air cleaner 5 and an air flow meter 6 for measuring the intake air flow rate. On the other hand, on the down stream side intake air path 2B connected to the outlet portion 4B of the compressor 4, there is provided air intake manifold 2C through inlet throttle valve 8.

An ignition plug 7 is mounted at a combustion chamber 10 of the engine and the mixture from the intake manifold 2C is introduced through an inlet valve 9. The intake air passing through the throttle valve 8 is mixed with fuel injected from a fuel injection valve 11 and the mixture of a predetermined ratio of air and fuel is supplied to the engine 1.

Reference numeral 12 indicates an exhaust path having an exhaust manifold 12A to which an inlet portion 15A of the exhaust gas turbine 15 is connected. The inlet portion 15A and the outlet portion 15B of the exhaust gas turbine 15 communicate with each other through a bypass path 16.

On the bypass path 16, there is provided an exhaust bypass valve 17 having a diaphragm unit 17a as a driving means and linkage 17e as shown in FIG. 3. The diaphragm unit 17a has a negative pressure chamber 17c separated by a diaphragm 17b and the supercharged pressure from the downstream of the compressor 4 is led to the negative pressure chamber 17c located upstream of the throttle valve 8 through a path 18. Accordingly, when the supercharged pressure is increased above a predetermined supercharged pressure value, the diaphragm 17b is moved against a restoring spring 17d so that the bypass path 16 may be opened by a valve member 17f through the linkage 17c. As a result, the opening or closing of the exhaust bypass valve 17 enables to control the maximum value of the supercharged pressure so as not to exceed the predetermined value.

At the inlet portion 15A of the exhaust gas turbine 15, there is provided a control valve 20 for controlling the exhaust gas flow speed to the exhaust gas turbine 15. The control valve 20 comprises a diaphragm unit 20a having a diaphragm 20b, first and second chambers 20c and 20d separated by the diaphragm 20b a spring 20i. The intake negative pressure is led into the first pressure chamber 20c from a path 21 through an electromagnetic valve 22 while the supercharged pressure which is a positive pressure is led into the second pressure chamber 20d from another path 19 through an electromagnetic valve 24. The diaphragm 20b is coupled to a control vane or control flap 20f through a rod 20h.

Accordingly, when no negative pressure is led into the first pressure chamber 20c and the positive pressure to be led into the second pressure chamber 20d is low, the diaphragm 20b is pushed by the spring 20i. As a result, the control flap 20f is in the position indicated by the solid line in FIG. 3, so as to increase the exhaust gas flow speed by reducing the control flap 20f.

On the other hand, however, when the negative pressure from the path 21 is introduced into the first chamber 20c or when the positive pressure, i.e., the supercharged pressure from the path 19 to be led into the second chamber 20d is increased, the diaphragm 20b is displaced toward the first chamber 20c and the control flap 20f is opened.

The electromagnetic valves 22 and 24 described in the foregoing, are formed in a three-way magnetic valve respectively. The electromagnetic valve 22 functions so as to dilute the supercharged pressure with the atmosphere or so as to selectively introduce the negative pressure or the atmosphere pressure. On the other hand, the electromagnetic valve 24 for controlling the supercharged pressure is turned on and off at a predetermined frequency and it controls the positive pressure to be introduced into the second pressure chamber 20d by changing the duty ratio of the ON and OFF time period.

An electronic control unit 23 comprises a microprocessor including a central processing unit (CPU), a random access memory (RAM), a read-only memory (ROM), an A/D converter, and an input/output interface, all not shown. The detected signals form the air flow meter 6, and engine speed sensor 25, a supercharge pressure sensor 26, a vehicle speed sensor 27, and a running position sensor of the gears of transmission 30 are applied to the electronic control unit 23 and they are converted into digital data corresponding to the intake flow rate Qa, the engine speed N, the throttle valve opening, the supercharge pressure P, etc., through the A/D converter in the control unit 23 in the well-known manner.

The microprocessor in the electronic control unit 23 performs various calculations from the input data and controls the electromagnetic valves 22 and 24, in accordance with the detected signals, which will be described in detail later.

As described in the above, the electronic control circuit 23 controls, on one hand, the pressure to be applied to the second pressure chamber 20d by controlling the electromagnetic valve 24 in accordance with the engine speed and the actual supercharge pressure P detected by the sensors 25 and 26, so as to achieve agreement with a preset supercharge pressure value Po to be set up in accordance with the operating conditions of the engine. In other words, when the actual supercharge pressure P is lowered below the predetermined value Po, the exhaust gas flow is increased by reducing the opening of the control valve 20, thus preventing the lowering of the number of rotation of the exhaust gas turbine 15, which leads to an increase in the supercharge pressure. On the other hand, when the actual supercharge pressure is increased, the exhaust gas flow is lowered by the full-opening of the control valve 20, thereby lowering the supercharge pressure for correction.

In this respect, however, it is normal in the control apparatus according to the prior art that even when the control valve 20 is fully opened in the case that the engine is operated at high speed and in a high load condition, the increase in the absolute amount of the exhaust gas flow rate will often cause the supercharge pressure to reach the upper limit value, without the reduction in the number of rotations of the exhaust gas turbine 15.

In the embodiment according to the present invention, however, since the exhaust bypass valve 17 is opened and the exhaust gas can be led downstream by bypassing the exhaust gas turbine 15 when the actual supercharge pressure detected by the sensor 26 is increased above, for instance, 400 mmHg, the exhaust gas energy to be supplied to the exhaust gas turbine 15 is reduced. As a result, the turbine speed is reduced and the actual supercharge pressure can be prevented from being excessively large, thus obviating damage of the engine.

In this manner as described above, in the normal operating conditions of the engine, both the control valve 20 and the bypass valve 17 are controlled, so as to perform a feedback control of the supercharge pressure to the predetermined value.

On the other hand, the electronic control unit 23 opens the electromagnetic valve 22, so as to communicate the intake negative pressure into the first pressure chamber 20c in accordance with the detected signals from the engine speed sensor 25, the car speed sensor 27, and the running condition sensor 28 mounted at the automatic transmission 30, when the idling condition of the vehicle or the running condition less than the preset vehicle speed, e.g., 10 Km/h is detected and the engine speed less than the preset engine speed. As a result, the diaphragm 20b is moved to a position where it is stopped by a stopper 20i, which means that the control valve 20 is opened a predetermined degree of opening compulsorily. Consequently, the exhaust gas flow rate flowing into the exhaust gas turbine 15 is lowered during the low-speed running or cruising speed less than the preset vehicle speed or the idling condition and this in turn lowers the number of rotations of the exhaust gas turbine 15, with the result that the increase in the supercharge pressure, as well as the excessive output power of the engine, is prevented.

Accordingly, transmission of a large drive torque to the power train can securely be prevented, with the gears of the transmission maintained at a low speed position, such as when the transmission 30 is suddenly changed from the neutral position during the idling condition to the running position or when shifting from the low speed condition to a suddenly accelerated condition. In this case, the suddenly accelerated condition can be detected by the throttle value sensor, not shown.

Furthermore, when the vehicle speed exceeds the predetermined value, the electronic control unit 23 now closes the electromagnetic valve 22 and the first pressure chamber 20c is released to the atmospheric pressure. As a result, the opening of the control valve 20 is throttled or reduced to the minimum opening and the exhaust gas flow rate flowing into the exhaust gas turbine 15 is increased. This is turn increases the rotating speed of the exhaust gas turbine 15 and the supercharged pressure is also increased by the high speed rotations of the compressor 4. In this case, when the car speed is increased, the torque necessary for driving the car wheels becomes relatively small, so that even when a high output power is produced from the engine, there is no excessive drive torque acting on the power train.

Figure 4:
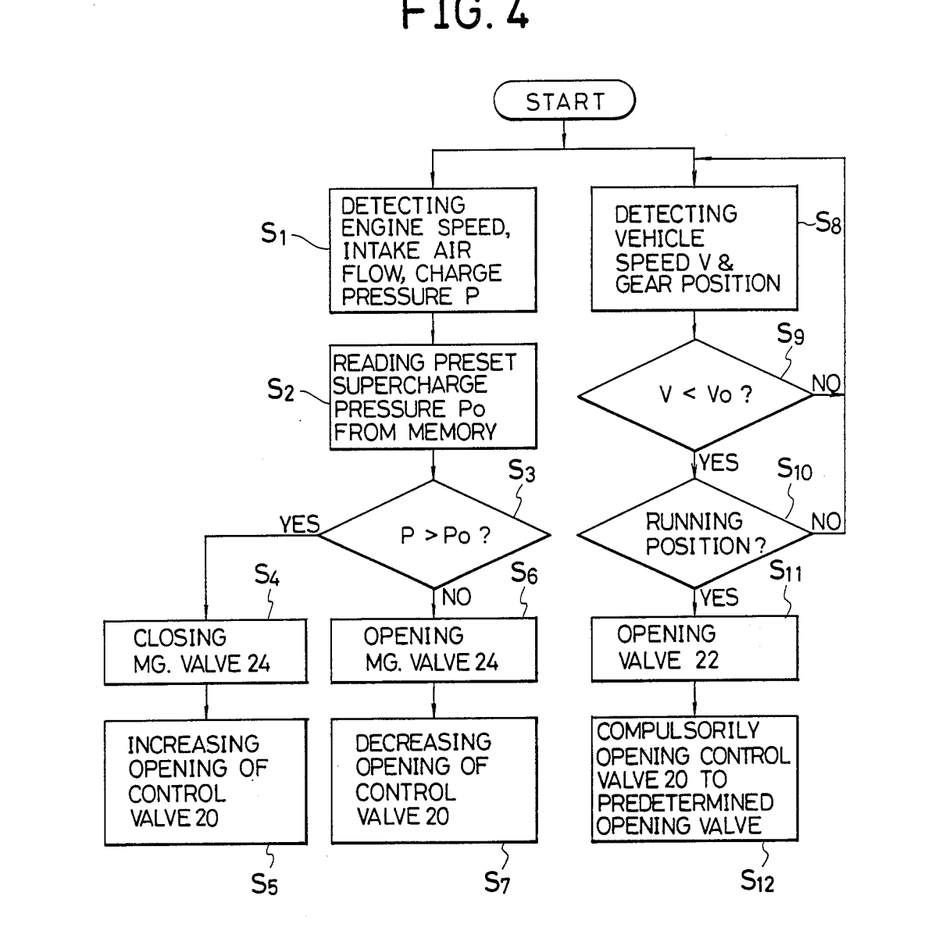

FIG. 4 shows a control program flow chart for controlling the openings of the valves 17 and 20 through the electromagnetic valves 22 and 24 using the electronic control unit 23 having the CPU, the ROM, and the RAM.

In operation, after starting the control, engine speed, intake air flow rate, and actual supercharge pressure P are detected by the sensors 6, 25, 26, etc. and stored in the RAM of the microprocessor in step S1 and the operation moves to step S2 where a target or preset supercharge pressure $P_o$ is read from a memory such as the ROM. After this operation, the actual supercharge pressure P is compared with the preset supercharge pressure $P_o$ in step S3.

If the result of the comparison is YES, that is, the actual supercharge pressure P is larger than the preset supercharge pressure $P_o$, the operation now moves to step S4 where the electromagnetic valve 24 is closed, so as to introduce air. For this purpose, the opening of the control valve 20 is increased in step S5.

On the other hand, if the result of the comparison in step S3 is NO, that is, the actual supercharge pressure P is smaller than the preset supercharge pressure $P_o$, the electromagnetic valve 24 is opened. To this end, the opening of the control valve 24 is reduced in step S7.

In addition, after starting the operation, the vehicle speed V and the gear position of the transmission 30 are also detected by the vehicle speed sensor 27 and the gear position sensor 28 (see FIG. 2) and stored into the RAM of the microprocessor in the electronic control unit 23 in step S8. After this operation, the next operation is executed. Namely, the actual vehicle speed V is compared with a preset vehicle speed $V_o$ in step S9.

If the result of the comparison in step S9 is No, i.e., the actual vehicle speed V is larger than the preset vehicle speed Vo the operation returns to the initial condition. However, if the result of the comparison in step S9 is YES, that is, relation V<Vo is established, the operation now moves to step S10, where a decision is made if the gear position of the transmission 30 is in the running position of the vehicle.

If the result of the decision in step S10 is NO, the operation returns to the initial condition. On the other hand, however, if the result of the decision in step S10 is YES, that is, the gear position is in the running position, the operation now moves to step S11.

In step S11, the electromagnetic valve 22 is opened by the electronic control unit 23 and intake negative pressure is introduced into the first pressure chamber 20c of the diaphragm unit 20a (see in FIG. 3), so as to maintain the control of a predetermined supercharge pressure. For this end, the control valve 20 is opened a predetermined degree of opening compulsorily in step S12 and the operation terminates.

In this embodiment according to the present invention, the vehicle speed and the gear positions of the transmission 30 are detected in order to fully open the control valve 20 a predetermined degree of opening compulsorily. However, it is also possible to open the control unit a predetermined degree of opening 20 compulsorily below the predetermined vehicle speed by only detecting the vehicle speed.

Figure 5:
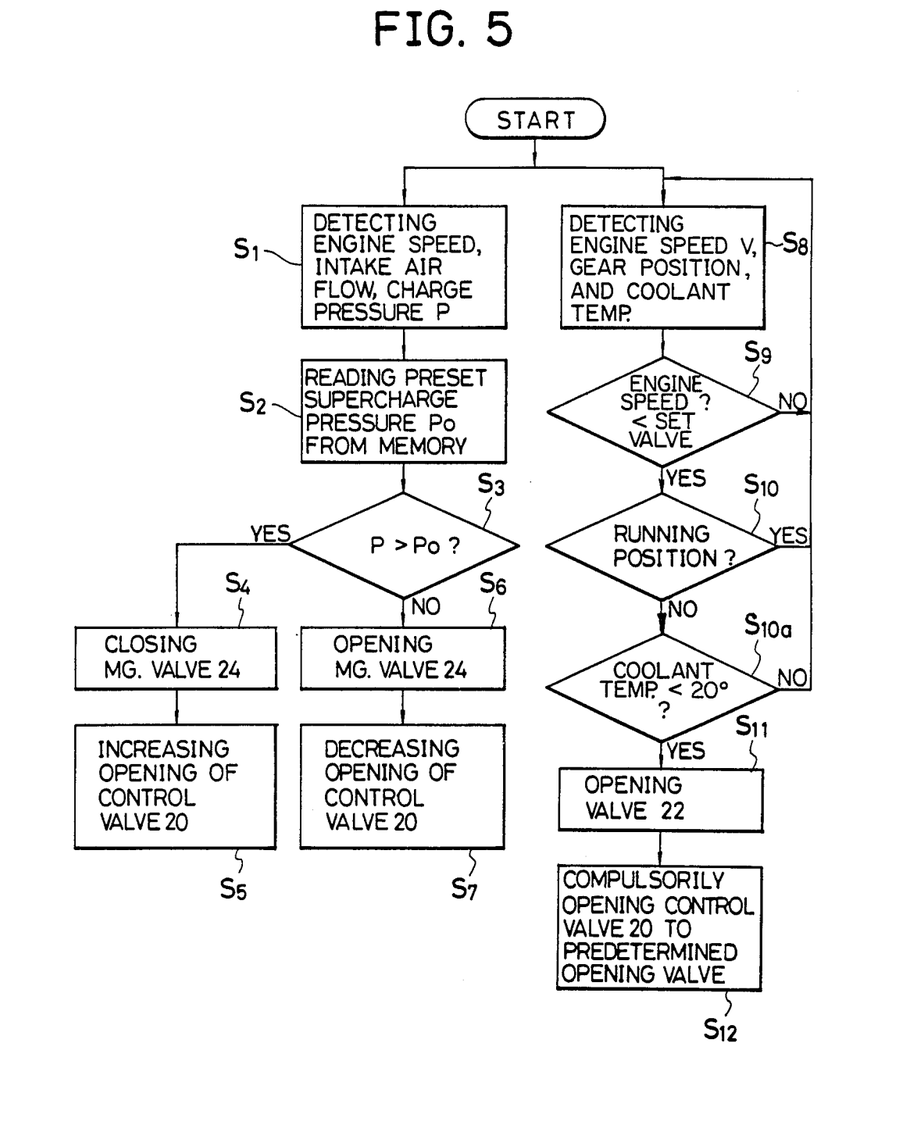

Moreover, it may also be possible that when the engine is in a cooling condition, for instance, when the temperature of the engine cooling water is below 20 degrees (e.g., when the engine speed in the idling condition is below a predetermined engine speed), the control valve 20 can be opened by a predetermined opening value (See step 10a in FIG. 5).

Figure 6:
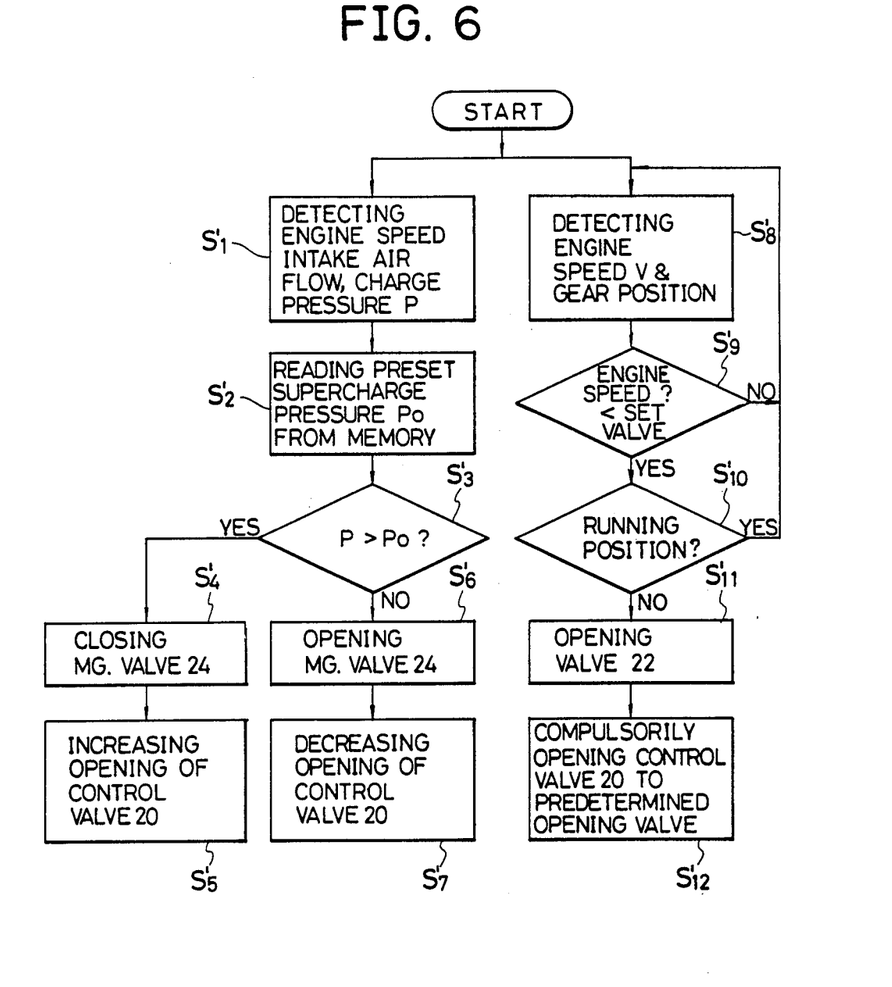

A flowchart similar to FIG. 4 is shown in FIG. 6 wherein engine speed is used in conjunction with the gear running position to determine engine idling.

As described in the foregoing embodiment according to the present invention, when the vehicle is in the idling condition or it is running at low speed below a predetermined vehicle speed, the flow speed of the exhaust gas flowing into the exhaust gas turbine is lowered by opening the control valve compulsorily. Consequently, excessive transmission of the drive torque to the power train can be prevented, with the gears of the transmission being maintained at the low speed position due to the suppression of the output power of the engine in advance, even when the gear position of the transmission is suddenly changed from the neutral position in the idling condition to the running position, or when changed from the low speed running to a rapidly accelerated condition of the vehicle. Accordingly, the durability of the power train can be improved in the present invention. Furthermore, the wear and seizure of the rotative shaft of the turbocharger can be prevented due to the low rotating speed of the exhaust gas turbine below a predetermined vehicle speed, while excessive increase in the engine speed during the no load condition or idling condition of the engine can also be prevented.

Moreover, damage to movable valves and pistons of the engine can be prevented as well as a reduction in engine noise. In addition, even when the control value is set to an excessively small value in the fully opened condition of the opening of the valve, a sufficient output power can be obtained at the initial period of the rapid accelerated condition of the vehicle without the excessive reduction of the exhaust gas flow rate.

While the invention has been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. A method of controlling supercharge pressure for a turbocharger of an engine on a vehicle which comprises the steps of:

(a) detecting actual supercharge pressure P;

(b) comparing the actual supercharge pressure thus detected, with a preset supercharge pressure $P_o$;

(c) controlling the degree of opening of a control valve for controlling the flow of exhaust gas flowing into an exhaust gas turbine of said turbocharger through a first electromagnetic valve in accordance with the results of the first comparison;

(d) detecting whether said vehicle is operating in a condition wherein vehicle speed is less than a predetermined value; and (e) compulsorily opening said control valve to a predetermined opened condition through a second electromagnetic valve when said vehicle speed is less than said predetermined value.

2. A supercharge pressure control apparatus for a turbocharger of an engine, which comprises:

(a) a plurality of detectors for detecting at least engine speed, actual supercharge pressure and transmission gear position;

(b) control valve means provided at the inlet portion of an exhaust gas turbine for controlling the flow of exhaust gas into said turbine and having a diaphragm and a linkage member connected between said diaphragm and a control flap for opening and closing said inlet portion in accordance with an operating condition of the engine;

(c) a first electromagnetic valve for controlling said control valve in accordance with a first control signal;

(d) a second electromagnetic valve for controlling said control valve in accordance with a second control signal; and (e) an electronic control unit including a microprocessor for controlling said first and second electromagnetic valves by generating said first and second signals in accordance with said operating condition of said engine and for compulsorily opening said control valve to a predetermined opened condition when the vehicle is in the idling condition and the transmission is in a neutral position.

* * * * *